United States Patent
White

(10) Patent No.: US 10,674,593 B2
(45) Date of Patent: Jun. 2, 2020

(54) PLASMA PROCESSING SYSTEM WITH CONSUMABLE IDENTIFICATION

(71) Applicant: Lincoln Global, Inc., Santa Fe Springs, CA (US)

(72) Inventor: Bryan K. White, Goose Creek, SC (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 288 days.

(21) Appl. No.: 15/705,701

(22) Filed: Sep. 15, 2017

(65) Prior Publication Data
US 2019/0090340 A1 Mar. 21, 2019

(51) Int. Cl.
| B23K 10/00 | (2006.01) |
| H05H 1/34 | (2006.01) |
| H05H 1/36 | (2006.01) |

(52) U.S. Cl.
CPC ......... H05H 1/3405 (2013.01); B23K 10/006 (2013.01); H05H 1/34 (2013.01); H05H 1/36 (2013.01); H05H 2001/3426 (2013.01); H05H 2001/3473 (2013.01); H05H 2001/3494 (2013.01)

(58) Field of Classification Search
CPC .......... H05H 1/3405; H05H 1/34; H05H 1/36; H05H 2001/3426
USPC .............. 219/121.39, 121.5, 121.51, 121.48, 219/121.52, 121.55
See application file for complete search history.

(56) References Cited

U.S. PATENT DOCUMENTS

| 7,186,944 | B2 | 3/2007 | Matus et al. | |
| 9,630,272 | B2* | 4/2017 | Gullotta | B23K 10/006 |
| 2009/0008370 | A1* | 1/2009 | Salsich | H05H 1/36 |
| | | | | 219/121.55 |
| 2013/0264317 | A1* | 10/2013 | Hoffa | B23K 9/16 |
| | | | | 219/121.53 |
| 2014/0061170 | A1* | 3/2014 | Lindsay | B23K 26/60 |
| | | | | 219/121.54 |

(Continued)

FOREIGN PATENT DOCUMENTS

| DE | 20 2016 003938 U1 | 10/2016 |
| EP | 3 043 628 A1 | 7/2016 |

(Continued)

OTHER PUBLICATIONS

Extended European Search Report from Corresponding Application No. 118194498.4; dated Feb. 1, 2019; pp. 1-10.

*Primary Examiner* — Mark H Paschall
(74) *Attorney, Agent, or Firm* — Brad C. Spencer

(57) ABSTRACT

A plasma processing system includes a torch having a consumable. A gas pressure regulator includes an input pressure sensor configured to sense an input pressure to the gas pressure regulator. A gas conduit supplies gas from the gas pressure regulator to the torch. A controller is operatively connected to the gas pressure regulator to receive an input pressure signal from the input pressure sensor and to provide a control signal to the gas pressure regulator to control operations of the gas pressure regulator and set an output pressure of the gas pressure regulator. The controller is configured to identify the consumable based on both of the input pressure to the gas pressure regulator and the control signal provided to the gas pressure regulator.

21 Claims, 5 Drawing Sheets

(56) References Cited

U.S. PATENT DOCUMENTS

2014/0113527 A1* 4/2014 Lindsay .................. B23K 5/00
                                                  451/5
2015/0127137 A1* 5/2015 Brandt .................... B23K 5/00
                                                  700/166
2015/0343555 A1   12/2015 Gullotta
2004/7000125       1/2017 Winn

FOREIGN PATENT DOCUMENTS

FR    2 803 978 A1   7/2001
WO    2015/094973 A  6/2015

* cited by examiner

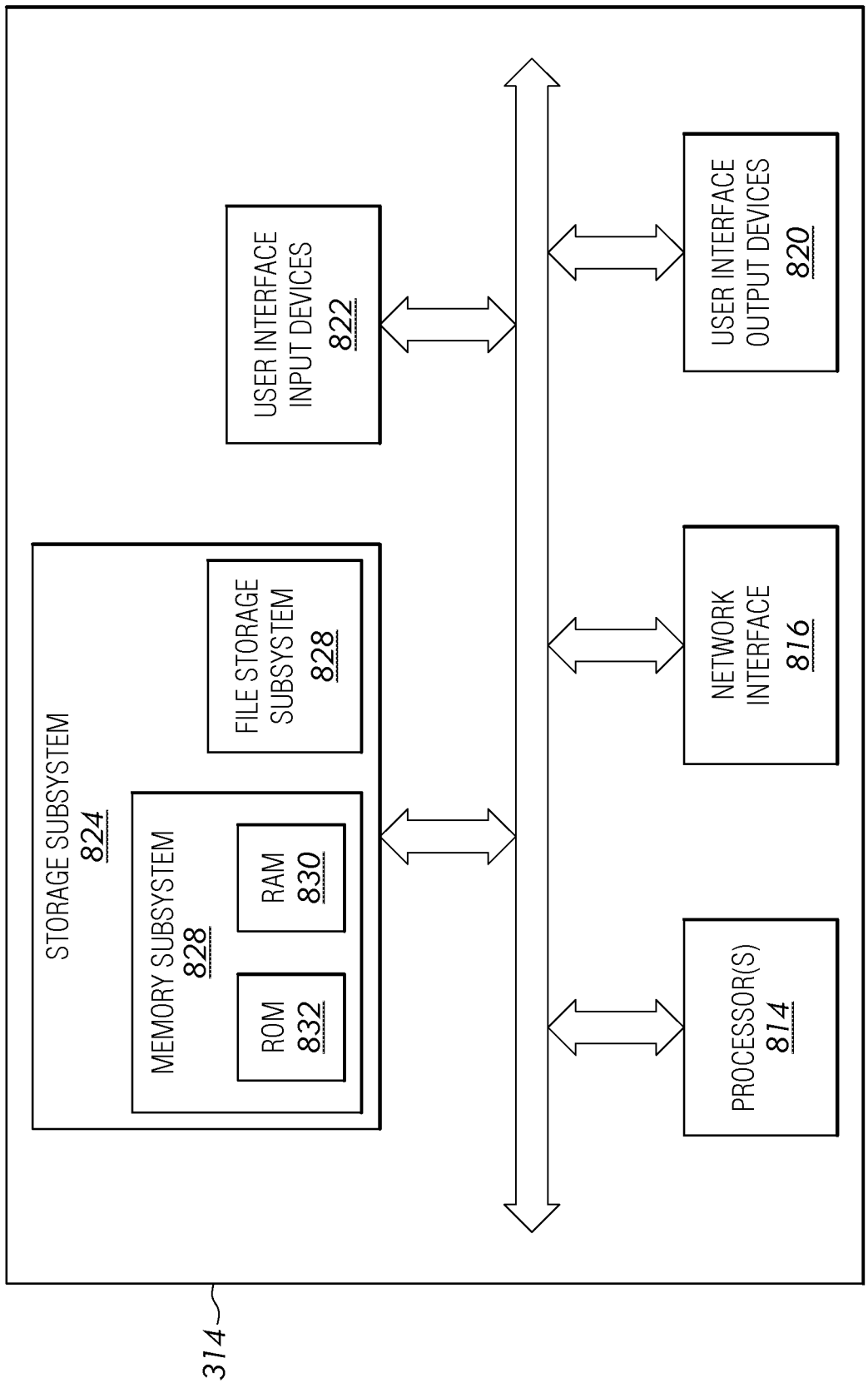

PLASMA PROCESSING SYSTEM WITH CONSUMABLE IDENTIFICATION

BACKGROUND OF THE INVENTION

Field of the Invention

Embodiments of the present invention relate to plasma processing systems employing torches having consumables within the torches.

Description of Related Art

Plasma torches can be used to perform plasma processing operations on a workpiece, such as cutting or gouging operations. The torches include various consumables that can be replaced after a period of use, or to match the amperage rating of the consumable to a plasma process to be performed. Example consumables include an electrode, swirl ring, nozzle, retaining cap, and shield cap. Consumables are commonly installed as a set that includes two or more of the consumables. For example, a replacement electrode, swirl ring and nozzle all having the same amperage rating might be installed together on a torch at the same time.

A single torch can utilize consumables having different amperage ratings, such as 50 A, 100 A, etc. If consumables having too low an amperage rating are used in a higher amperage plasma process, the consumables and possibly the torch can be damaged, resulting in increased expense and downtime. Thus, the ability to detect whether consumables are properly or improperly sized for a plasma operation would be beneficial.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a plasma processing system. The plasma processing system comprises a torch, and the torch comprises a consumable. A gas pressure regulator comprises an input pressure sensor configured to sense an input pressure to the gas pressure regulator. A gas conduit supplies gas from the gas pressure regulator to the torch. A controller is operatively connected to the gas pressure regulator to receive an input pressure signal from the input pressure sensor and to provide a control signal to the gas pressure regulator to control operations of the gas pressure regulator and set an output pressure of the gas pressure regulator. The controller is configured to identify the consumable based on both of the input pressure to the gas pressure regulator and the control signal provided to the gas pressure regulator. The plasma processing system can comprise a memory accessible by the controller, wherein the memory stores a correlation between input pressures to the gas pressure regulator and respective position signal levels of said position signal. In certain embodiments, the gas pressure regulator can comprise a proportional valve, and the control signal is a position signal for the proportional valve. The plasma processing system can further comprise an output pressure sensor downstream of the gas pressure regulator and configured to sense an output pressure of the gas pressure regulator, wherein the controller is operatively connected to the output pressure sensor to receive an output pressure signal from the output pressure sensor, and wherein the controller is configured to identify the consumable based on the input pressure to the gas pressure regulator, the control signal provided to the gas pressure regulator, and the output pressure of the gas pressure regulator. In certain embodiments, the controller performs a proportional integral derivate (PID) control routine to generate the control signal. The plasma processing system can further comprise a user interface operatively connected to the controller, wherein the user interface displays an alarm message when an amperage rating of the consumable does not match an amperage level of a plasma processing operation. In certain embodiments, the consumable is a swirl ring, and in certain embodiments the consumable includes a swirl ring and a nozzle. In certain embodiments, the control signal provided to the gas pressure regulator has a duty cycle, and the controller is configured to identify the consumable based on the input pressure to the gas pressure regulator and the duty cycle of the control signal.

In accordance with another aspect of the present invention, provided is a plasma processing system. The plasma processing system comprises a torch. The torch comprises a consumable installed on the torch. A gas pressure regulator comprises a proportional valve and a pressure sensor downstream of the proportional valve. A gas conduit supplies gas from the gas pressure regulator to the torch. A controller is operatively connected to the gas pressure regulator to receive a pressure signal from the pressure sensor, and to provide a position signal to the gas pressure regulator to control operations of the proportional valve and set an output pressure of the gas pressure regulator. A memory is accessible by the controller and stores an expected consumable parameter. The controller is configured to determine whether the consumable installed on the torch corresponds to the expected consumable parameter based on a position of the proportional valve. In certain embodiments, the controller determines the position of the proportional valve from the position signal. The plasma processing system can comprise an input pressure sensor configured to sense an input pressure to the gas pressure regulator, wherein the controller is operatively connected to the input pressure sensor to receive an input pressure signal from the input pressure sensor, and wherein the controller is configured to determine whether the consumable installed on the torch corresponds to the expected consumable parameter based on the position signal and the input pressure signal. In certain embodiments, the controller performs a proportional integral derivate (PID) control routine to generate the position signal. The plasma processing system can comprise a user interface operatively connected to the controller, wherein the user interface displays an alarm message when an amperage rating of the consumable does not match an amperage level of a plasma processing operation. In certain embodiments, the consumable includes a swirl ring. In certain embodiments, the position signal provided to the gas pressure regulator has a duty cycle, and the controller is configured to determine whether the consumable installed on the torch corresponds to the expected consumable parameter based on the duty cycle of the position signal. In certain embodiments, the position signal provided to the gas pressure regulator has a magnitude, and the controller is configured to determine whether the consumable installed on the torch corresponds to the expected consumable parameter based on the magnitude of the position signal.

In accordance with another aspect, provided is a plasma processing system for performing a plasma operation. The plasma processing system comprises a torch. The torch comprises a consumable installed on the torch. A gas pressure regulator comprises a proportional valve and a pressure sensor downstream of the proportional valve. A gas conduit supplies gas from the gas pressure regulator to the torch. A controller is operatively connected to the gas pressure regulator to receive a pressure signal from the pressure sensor, and to provide a position signal to the gas pressure regulator to control operations of the proportional valve and set an output pressure of the gas pressure regulator. The controller is configured to identify the consumable based on a position of the proportional valve, and generate an alarm output when an amperage rating of the consumable does not match an amperage level of the plasma operation. In certain embodiments, the controller determines the position of the proportional valve from the position signal. The plasma processing system can comprise an input pressure sensor configured to sense an input pressure to the gas pressure regulator, wherein the controller is operatively connected to the input pressure sensor to receive an input pressure signal from the input pressure sensor, and wherein the controller is configured to identify the consumable based on the position signal and the input pressure signal. The plasma processing system can further comprise a memory accessible by the controller, wherein the memory stores, in association with a parameter of the consumable, a correlation between input pressures to the gas pressure regulator and respective position signal levels of said position signal. The plasma processing system can comprise a user interface operatively connected to the controller, wherein the user interface displays an alarm message based on the alarm output, and wherein the controller performs a proportional integral derivate (PID) control routine to generate the position signal.

BRIEF DESCRIPTION OF THE DRAWINGS

FIG. 5 is a schematic diagram of an example controller.

DETAILED DESCRIPTION OF THE INVENTION

Figure 1:
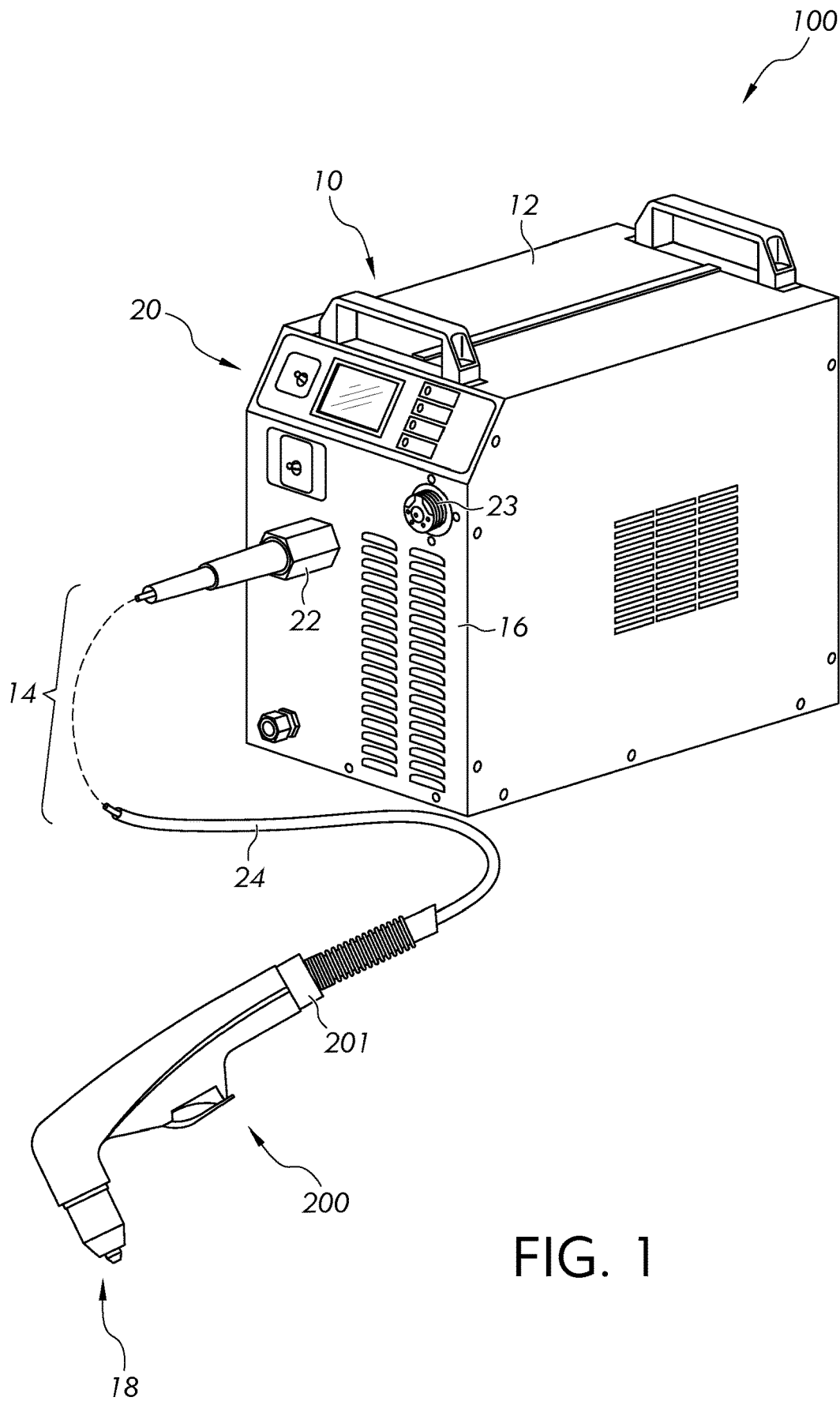
FIG. 1 shows an example plasma cutting system.

Embodiments of the present invention relate to plasma processing systems. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Described herein is a plasma processing system, such as a plasma cutting or gouging apparatus, that can automatically identify one or more of the consumables installed in the torch of the plasma processing system. For example, the plasma processing system can verify that the correct consumable or set of consumables is installed on the torch, or determine that that an incorrect consumable or set of consumables is installed. In certain embodiments, the plasma processing system can determine whether the consumable(s) installed on the torch match an expected consumable (or parameter associated with the consumable) that is correct for a particular plasma operation to be performed. If an incorrect consumable is determined to be currently installed on the torch, the plasma processing system can generate a warning for a user of the plasma processing system and/or prohibit the plasma operation from proceeding.

FIG. 1 shows an exemplary plasma processing system 100, such as a plasma cutting system. The system 100 contains a power supply 10 which includes a housing 12 with a connected torch assembly 14. Housing 12 includes the various conventional components for controlling a plasma arc torch, such as power supply electronics, a plasma starting circuit, gas pressure regulators, input and output electrical and gas connectors, controllers, circuit boards, etc. Torch assembly 14 is attached to a front side 16 of the housing 12. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly 14 to transfer the gas that becomes the plasma arc to the torch tip. Various user interface devices 20 such as buttons, switches, dials, indicators, displays, etc. may be provided on housing 12, along with various electrical and gas connectors.

It should be understood that the housing 12 illustrated in FIG. 1 is but a single example of a plasma device that could employ aspects of the inventive concepts disclosed herein. Accordingly, the general disclosure and description above should not be considered limiting in any way as to the types or sizes of plasma devices that could employ the inventive concepts disclosed herein.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but the torch 200 can be of the mechanized or automated type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include consumables such as the torch electrode, swirl ring, nozzle, retaining cap and shield cap.

Figure 2:
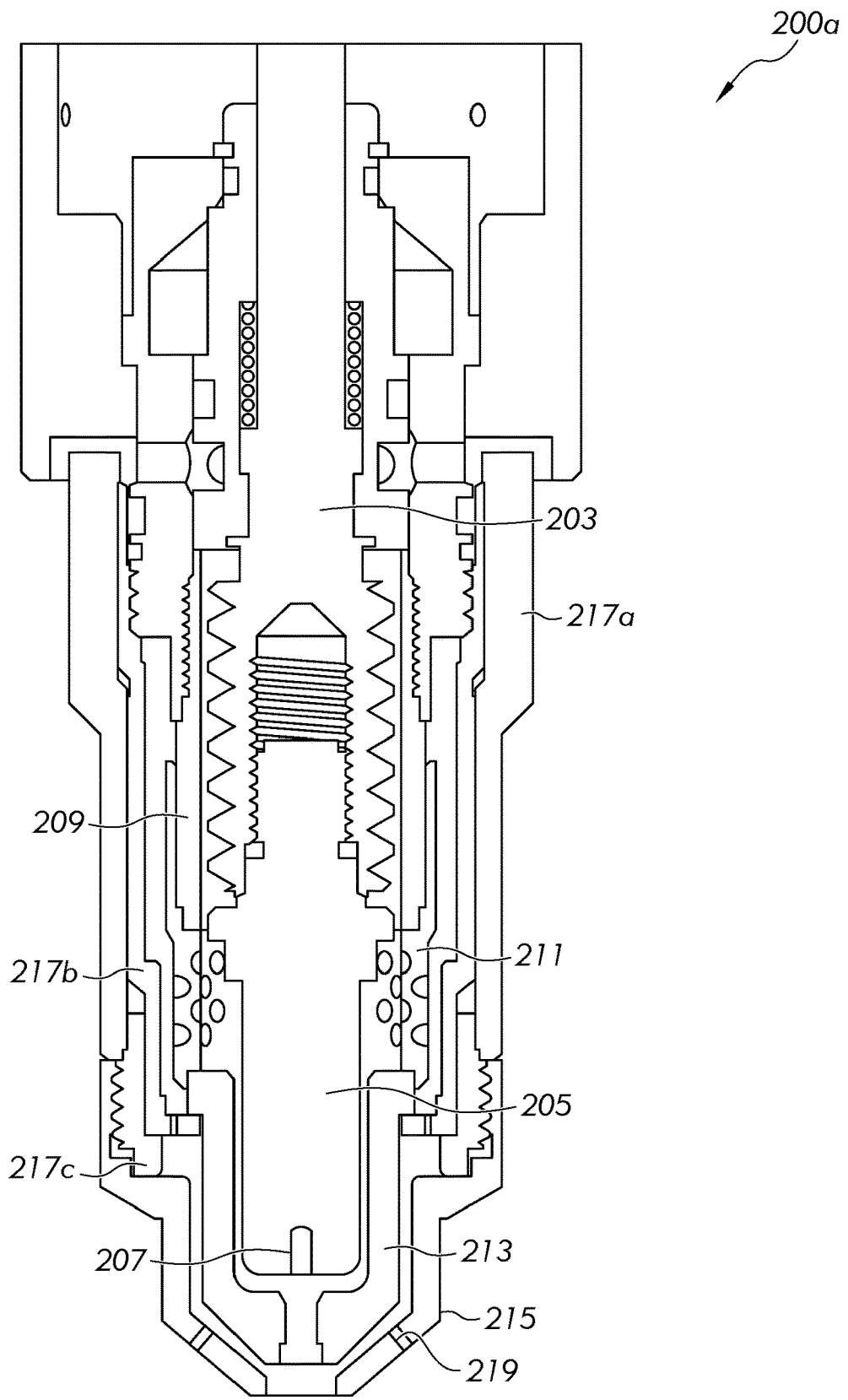
FIG. 2 shows a portion of a plasma torch.

FIG. 2 depicts a cross-section of an exemplary torch head 200a of a known construction. It should be noted that some of the components of the torch head 200a are not shown for clarity. As shown, the torch head 200a contains a cathode body 203 to which an electrode 205 is electrically coupled. The electrode 205 is inserted into an inside cavity of a nozzle 213, where the nozzle 213 is seated into a swirl ring 211 which is coupled to an isolator structure 209 which isolates the swirl ring, nozzle etc. from the cathode body 203. The nozzle 213 is held in place by a retaining cap assembly 217a-c.

The electrode 205 can have a threaded portion which threads the electrode into the cathode body 203. The electrode 205 can also include a hafnium insert 207 that is inserted into the distal end of the electrode. It is generally known that the plasma jet/arc initiates from this hafnium insert 207, which is centered on the flat surface of the distal end of the electrode 205.

The torch head 200a also includes a nozzle 213 which has a throat through which the plasma jet is directed during cutting. The swirl ring 211 has small vent holes that transform the plasma gas into a swirling vortex that exits the torch through the nozzle throat. The torch head 200a can also include a shield cap 215 that covers the nozzle 213. A shielding gas can flow between the shield cap 215 and nozzle 213 and be discharged from the orifices 219 in the shield cap during a plasma operation.

Figure 3:
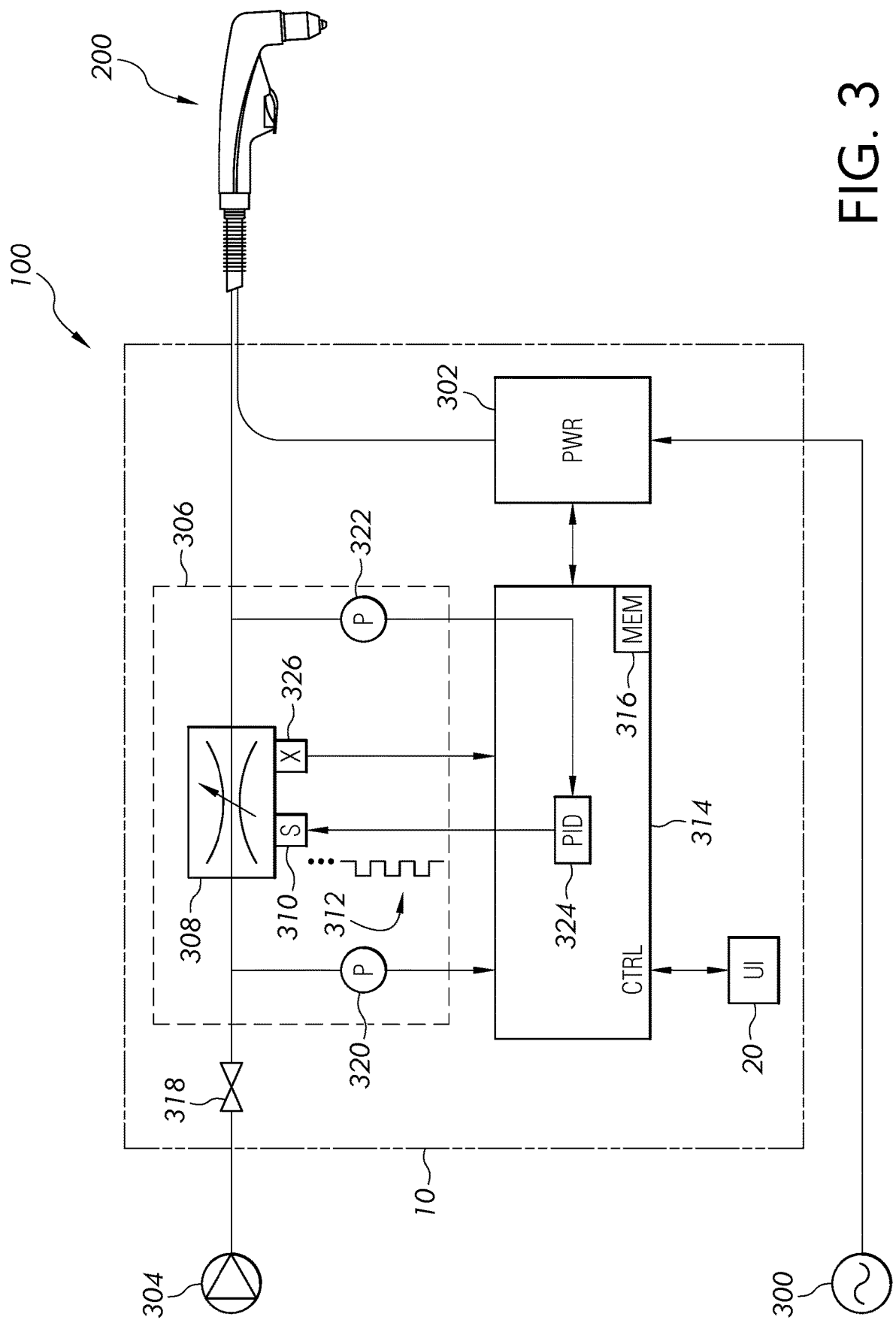
FIG. 3 is a schematic diagram of a plasma cutting system.

FIG. 3 is a schematic diagram of a plasma processing system 100, and in particular of the power supply 10. The power supply receives electrical power from a power source 300, such as a commercial power source or generator. Power electronics 302 and other electrical components/circuitry within the power supply 10 utilize the incoming electrical power to generate plasma during cutting, gouging, etc. in a known manner, and need not be described in detail herein.

The power supply 10 is also connected to a source of pressurized gas 304, such as shop air or a tank of compressed gas. The pressurized gas is used to create the plasma jet from the torch 200. A gas pressure regulator 306 within the power supply 10 reduces the incoming gas pressure to a usable gas pressure. The source of pressurized gas 304 can have a substantially constant pressure, or have a range of normal pressures. For example, the power supply 10 could be connected to a source of shop air that has a range of normal pressures between about 90 to 150 psi. The gas pressure regulator 306 can reduce the pressure of the incoming gas, whether it be 90 psi, 150 psi, or some pressure level in between, to a usable pressure level. The usable gas pressure can be different for different plasma operations or installed consumables. For example, a higher current plasma operation (e.g., 100A) might utilize a different output pressure from the gas pressure regulator than a lower current plasma operation (e.g., 50A). An example range of output gas pressures from the gas pressure regulator 306 is 45-55 psi.

In an example embodiment, the gas pressure regulator 306 includes a proportional valve 308 to reduce the incoming gas pressure to a usable pressure suitable for plasma operation to be performed. A proportional valve 308 typically includes a movable spool that reduces the pressure of the gas flowing through the pressure regulator 306 based on the position of the spool and the corresponding size of an adjustable orifice in the valve. The position of the spool can be controlled by a solenoid 310 having a coil and a spring-biased plunger attached the spool. Based on the level of a position signal 312 applied to the solenoid 310, the position of the spool within the regulator 306 and, thus, the output pressure, can be set and/or adjusted. Various types of position signals can be applied to the solenoid, such as a voltage (e.g. 0-24 V) or current (e.g., 4-20 mA) level, or the solenoid can be controlled based on the duty cycle (0%-100%) of a periodic waveform, for example. In certain embodiments, the control or position signal 312 can be merely a value or number that is converted into a corresponding positioning signal by processing circuitry within the gas pressure regulator 306. Although the gas pressure regulator 306 has been described in the context of a proportional valve, other types of gas pressure regulators could be employed in the power supply 10, such as a motor-operated valve for example.

The power supply 10 includes a controller 314 that is operatively connected to the gas pressure regulator 306. The controller 314 provides the control signal 312 to the gas pressure regulator 306 to control the operations of the gas pressure regulator and set the output pressure of the regulator. The controller 314 can be an electronic controller and may include a processor. The controller 314 can include one or more of a microprocessor, a microcontroller, a digital signal processor (DSP), an application specific integrated circuit (ASIC), a field-programmable gate array (FPGA), discrete logic circuitry, or the like. The controller 314 can include a memory portion 316 (e.g., RAM or ROM) storing program instructions that cause the controller to provide the functionality ascribed to it herein. The memory portion 316 can be part of the controller 314 or a separate device that is accessible by the controller. The controller 314 can include a plurality of physically separate circuits or electronic devices, such as a processor in combination with separate comparators, logic circuits, etc. However, for ease of explanation, the controller 314 is shown as a monolithic device. In certain embodiments, the controller 314 can control operations of the power electronics 302 in the power supply 10, to thereby control a plasma processing operation, in addition to controlling operations of the gas pressure regulator 306.

The controller 314 also controls the operation of a shut off valve 318, which may be a normally-closed solenoid valve, located upstream of the pressure regulator 306. The controller 314, via the shut off valve 318, can control the provision of gas to the torch 200. Thus, the controller 314 can control both of the provision of gas to the torch 200 and the pressure of the delivered gas.

The pressure regulator 306 includes an input pressure sensor 320 located upstream of the proportional valve 308. The input pressure sensor 320 senses the input gas pressure to the regulator 306 (e.g., the pressure of the shop air), and generates a corresponding input pressure signal. The controller 314 is operatively connected to the pressure regulator 306 to receive the input pressure signal from the input pressure sensor 320 and monitor the pressure of the gas supplied to the power supply 10. The pressure regulator 306 also includes an output pressure sensor 322 located downstream of the proportional valve 308. The output pressure sensor 322 senses the output gas pressure between the regulator 306 and the torch 200 and generates a corresponding output pressure signal. The controller 314 is operatively connected to the pressure regulator 306 to receive the output pressure signal from the output pressure sensor 322 and monitor the pressure of the gas supplied to the torch 200. Thus, the controller 306 can monitor both the pressure of the gas supplied to the power supply 10 and the pressure of the gas supplied to the torch 200.

It is to be appreciated that the pressure of the gas supplied to the torch 200 is largely determined by the flow rate of the gas through the torch and through the pressure regulator 306. The consumables in the torch 200, and in particular the swirl ring and nozzle, provide restrictions to the gas flow through the torch, causing a pressure drop that can be sensed by the output pressure sensor 322. For a given plasma operation to be performed, the controller 314 can control the flow rate of gas through the torch 200 so that the flow rate equals a predetermined level that is appropriate for that plasma operation. The controller 314 does this by monitoring the output pressure signal from the output pressure sensor 322 and adjusting the position of the proportional valve 308 to achieve a desired output pressure, which corresponds to the desired flow rate. In certain embodiments, the controller 314 can perform a proportional integral derivate (PID) control routine to generate the position signal 312 based on feedback from the output pressure sensor 322. In such embodiments, the controller 314 can include an error calculation/PID processing portion 324 that receives the output pressure signal from the output pressure sensor 322 and calculates the error of the output pressure (i.e., the deviation of the current output pressure from a desired setpoint output pressure). The error is then processed according to a PID algorithm to generate the position signal 312, which is supplied to the pressure regulator 308.

When the desired gas flow rate and output pressure are achieved, the position of the proportional valve 308 will depend on the pressure of the gas supply to the pressure regulator 306. As the pressure of the supply gas (e.g., shop air or gas cylinder pressure) changes, so will the correct position of the proportional valve (e.g., the spool position) that provides the desired output pressure from the regulator 306.

For a desired plasma operation, the memory portion 316 can store an expected consumable parameter(s) for use by the controller 314 to automatically determine whether one or more of the consumables installed in the torch 200 are correct or incorrect for the desired plasma operation. The expected consumable parameters stored in the memory portion 316 can allow the controller 314 to identify the installed consumable(s). For example, the controller 314 can make a determination as to whether the installed consumable(s) correspond to the expected consumable parameters. Expected consumable parameters can include, for example, consumable name or model number, amperage rating, size, regulator 306 output pressure, expected position signal 312 for the plasma operation, expected proportional valve 308 position for the plasma operation, and the like. Expected consumable parameters can also include combinations of parameters, such as consumable name, rated amperage, model number, or regulator 306 output pressure in combination with the expected position signal or proportional valve position. Another example is a correlation between input pressures to the gas pressure regulator 306 and respective position signal levels (duty cycle, magnitude, value, etc.) or proportional valve positions. A further example is an interrelationship among three or more different parameters to define an expected consumable for a plasma operation, such as a regulator 306 output pressure and a correlation between input pressures to the gas pressure regulator 306 and respective position signal levels (duty cycle, magnitude, value, etc.) or proportional valve positions for achieving the regulator output pressure.

When the installed consumable(s) do not correspond to or match the expected consumable parameter(s), the controller can generate an alarm output that is communicated to a user, such as via the user interface 20. For example, if the amperage rating of the installed swirl ring, electrode, nozzle, or set or consumables does not match the amperage level of the plasma operation to be performed, the controller 314 can generate an alarm. In certain embodiments, the controller 314 can also disable or prohibit the plasma operation from occurring when improper consumables are detected, to prevent damage to the consumables and torch.

An example method performed by the power supply 10 for testing the consumables installed on the torch 200 to identify or verify them as correct for the plasma process to be performed (e.g., to determine whether or not the consumables correspond to a stored expected consumable parameter associated with the plasma process) is discussed below.

Initially, a user can select a desired plasma operation to be performed via the user interface. For example, the user can select an amperage level of a plasma cutting operation. The controller 314 will have a stored output pressure for the pressure regulator 306 corresponding to the selected plasma operation. The stored output pressure will correspond to the resistance to gas flow of the correct consumable(s), and the correct gas flow rate, for the selected plasma operation. The controller 314 reads the stored output pressure for the selected plasma operation to establish a control setpoint, and opens the shut off valve 318 to commence gas flow through the pressure regulator 306 and torch 200. The controller 314 then compares the output pressure signal from the output pressure sensor 322 to the control setpoint to generate an error signal. The error signal is used to generate a control signal for controlling operations of the gas pressure regulator 306. For example, the error signal can be processed by a PI or a PID routine to generate a position signal, such as voltage or current level or duty cycle, that controls the position of the pressure regulator 306.

The controller 314 adjusts the position of the pressure regulator 306 until a steady state is achieved, with the error signal near or at 0 or within a ±tolerance range around 0. With the correct regulator output pressure set, the controller 314 can determine whether the correct consumables are installed in the torch.

Each set of consumables can have a unique resistance to gas flow. This property can be used to identify the consumables from the position or orifice size of the proportional valve 308 and the input pressure to the gas pressure regulator 306. The position of the proportional valve 308 will change in accordance with input pressure changes, to achieve the desired output pressure from the regulator 306 and gas flow rate through the consumables. For example, if the input gas pressure drops, the controller 314 will further open the proportional valve 308 to maintain the output pressure at the desired level. Conversely, if the input gas pressure rises, the controller 314 will close the valve to reduce its orifice size and increase the pressure drop through the pressure regulator 306.

Accordingly, a unique signature for a plasma operation and its expected consumables can be created that correlates a range of input pressures to the gas pressure regulator 306 to respective different positions of the proportional valve 308, which achieve the desired output pressure. The correlation of input pressures and respective regulator positions can be stored in the memory portion 316 for each plasma operation. The stored correlations can be in the form of look up tables, parameter curves, or any other suitable format. The correlations or unique signatures linking output gas pressure and installed consumables to proportional valve positions at various input gas pressure levels can be obtained experimentally.

With the correct regulator output pressure set, the controller 314 can compare the input pressure and the current position of the regulator 306 to the unique signature (e.g., stored lookup table, curve, etc.) associated with the current plasma operation or expected consumables. The level of the control signal 312 that the controller 314 provides to the pressure regulator 306 will correspond to the current position of the regulator. Thus, the controller 314 can determine the current position of the pressure regulator 306 directly from the magnitude or duty cycle of the control signal (e.g., position signal) supplied to the solenoid 310. In certain embodiments, the pressure regulator 306 can include a position sensor 326, such as a linear variable differential transformer (LVDT) that provides a position feedback signal to the controller 314, and the controller can determine the current position of the regulator from the position feedback signal.

From the unique signature for the plasma operation, based on the input gas pressure, an expected position of the pressure regulator 306 can be determined by the controller 314. If the current position of the pressure regulator 306 (as determined from the control signal or position feedback signal) matches the expected position, the controller 314 verifies the installed consumables as being correct for the selected plasma operation. Conversely, if the position of the pressure regulator 306 does not match the expected position, the controller 314 generates an alarm (e.g., to alert a user that the amperage rating of the consumables does not match an amperage level of the plasma operation).

As an example, if consumables are improperly installed in the torch 200 that provide a less than expected resistance to gas flow, the controller 314 will open the proportional valve 308 more than expected to achieve the correct regulator output pressure. The controller 314 can recognize the proportional valve 308 as being "too open" for the given input pressure level, and generate an alarm. Conversely, if consumables are installed on the torch that provide too great a resistance to gas flow, the controller 314 will close the proportional valve 308 more than expected to achieve the correct regulator output pressure. The position of the proportional valve 308 can be used to verify the consumables as being correct for the current plasma operation or identify them as incorrect for the current plasma operation.

In certain embodiments, correlations between input gas pressure and expected regulator 306 positions for incorrect consumables can be stored, to allow the controller to determine the identity, size or amperage rating of incorrectly-installed consumables. The controller 314 can automatically adjust parameters of the plasma operation, such as maximum amperage, to accommodate incorrectly-installed consumables.

In certain embodiments, the input pressure to the pressure regulator 306 is fixed and does not change, and the installed consumables can be identified from just the position of the pressure regulator.

Figure 4:
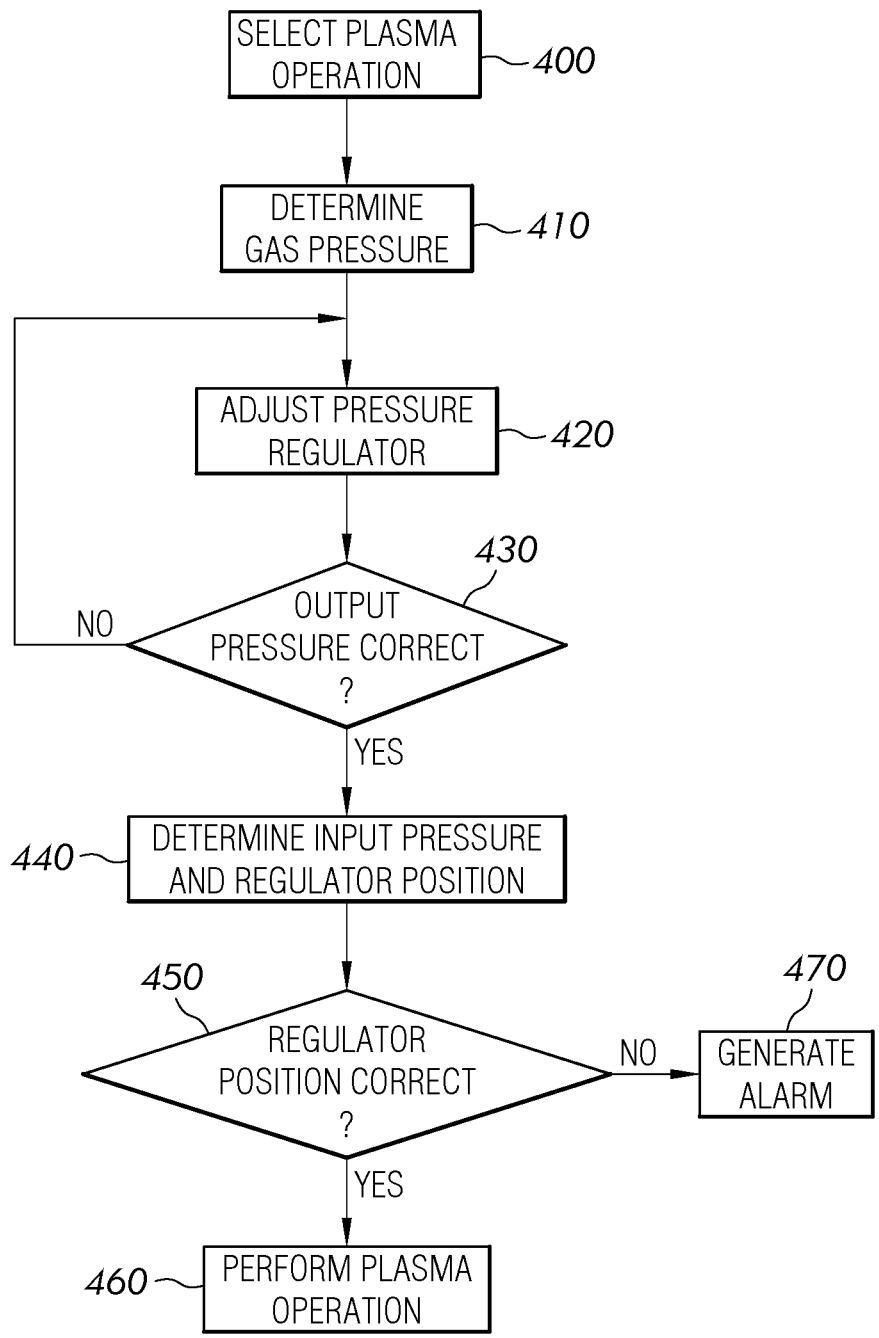
FIG. 4 is a flow diagram.

FIG. 4 provides a flow diagram of an example process incorporating aspects of the method described above. In step 400, the user selects a plasma operation to be performed, such as a cutting or gouging operation at a selected amperage level. A gas pressure is then selected for the plasma operation (step 410). The gas pressure regulator is then adjusted to reduce the pressure of the incoming gas supply (step 420). The gas pressure regulator is adjusted, e.g., the position of the proportional valve is moved outward or inward to adjust a valve orifice, until the correct output pressure is achieved (step 430). When the correct output pressure is achieved, the input pressure to the pressure regulator and the current position of the regulator are determined (step 440). A determination is then made as to whether or not the current position of the regulator is correct for the current input pressure level (step 450). If the position of the regulator is correct, the plasma operation is performed (step 460). If the position of the regulator is incorrect, an alarm is generated to indicate that the wrong consumable is installed in the torch (step 470).

FIG. 5 illustrates an example embodiment of controller 314 and user interface 20 (FIG. 3). The example controller includes at least one processor 814 which communicates with a number of peripheral devices via bus subsystem 812. These peripheral devices may include a storage subsystem 824, including, for example, a memory subsystem 828 and a file storage subsystem 826, a user interface (e.g., user interface input devices 822 and user interface output devices 820), and a network interface subsystem 816. The input and output devices allow user interaction with the controller 314. Network interface subsystem 816 provides an interface to outside networks and can be coupled to corresponding interface devices in other computer systems or programmable devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 314 (FIG. 3) or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 314 to the user or to another machine or computer system.

Storage subsystem 824 stores programming and data constructs that provide the functionality of some or all of the operations described herein. For example, the storage subsystem 824 may include programming instructions to allow the controller 314 to execute the PID routine and the consumable identification routine described above.

Firmware or software modules having the programming instructions are generally executed by processor 814 alone or in combination with other processors. Memory subsystem 828 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 314 communicate with each other as intended. Although bus subsystem 812 is shown schematically as a single bus, alternative embodiments of the bus subsystem may use multiple buses.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A plasma processing system, comprising:
a torch comprising a torch consumable;
a gas pressure regulator, wherein the gas pressure regulator comprises an input pressure sensor configured to sense an input pressure to the gas pressure regulator;
a gas conduit supplying gas from the gas pressure regulator to the torch; and
a controller comprising a processor and a memory, wherein the controller is operatively connected to the gas pressure regulator to receive an input pressure signal from the input pressure sensor and to provide a control signal to the gas pressure regulator to control operations of the gas pressure regulator and set an output pressure of the gas pressure regulator,
wherein the memory stores a correlation between input pressures to the gas pressure regulator and respective levels of said control signal for multiple consumables, and wherein the controller is configured to identify the torch consumable based on both of the input pressure to the gas pressure regulator and the control signal provided to the gas pressure regulator.

2. The plasma processing system of claim 1, wherein the gas pressure regulator comprises a proportional valve, and the control signal is a position signal for the proportional valve.

3. The plasma processing system of claim 1, further comprising an output pressure sensor downstream of the gas pressure regulator and configured to sense an output pressure of the gas pressure regulator, wherein the controller is operatively connected to the output pressure sensor to receive an output pressure signal from the output pressure sensor, and wherein the controller is configured to identify the torch consumable based on the input pressure to the gas pressure regulator, the control signal provided to the gas pressure regulator, and the output pressure of the gas pressure regulator.

4. The plasma processing system of claim 1, wherein the controller performs a proportional integral derivate (PID) control routine to generate the control signal.

5. The plasma processing system of claim 1, further comprising a user interface operatively connected to the controller, wherein the user interface displays an alarm message when an amperage rating of the torch consumable does not match an amperage level of a plasma processing operation.

6. The plasma processing system of claim 1, wherein the torch consumable is a swirl ring.

7. The plasma processing system of claim 1, wherein the torch consumable includes a swirl ring and a nozzle.

8. The plasma processing system of claim 1, wherein the control signal provided to the gas pressure regulator has a duty cycle, and the controller is configured to identify the torch consumable based on the input pressure to the gas pressure regulator and the duty cycle of the control signal.

9. A plasma processing system, comprising:
a torch comprising a consumable installed on the torch;
a gas pressure regulator comprising a proportional valve, and a pressure sensor downstream of the proportional valve;
a gas conduit supplying gas from the gas pressure regulator to the torch;
a controller comprising a processor, wherein the controller is operatively connected to the gas pressure regulator to receive a pressure signal from the pressure sensor, and to provide a position signal to the gas pressure regulator to control operations of the proportional valve and set an output pressure of the gas pressure regulator; and
a memory accessible by the controller and storing expected consumable parameters including expected proportional valve positions,
wherein the controller is configured to determine whether the consumable installed on the torch corresponds to at least one of the expected consumable parameters based on a position of the proportional valve.

10. The plasma processing system of claim 9, wherein the controller determines the position of the proportional valve from the position signal.

11. The plasma processing system of claim 10, further comprising an input pressure sensor configured to sense an input pressure to the gas pressure regulator, wherein the controller is operatively connected to the input pressure sensor to receive an input pressure signal from the input pressure sensor, and wherein the controller is configured to determine whether the consumable installed on the torch corresponds to the at least one of the expected consumable parameters based on the position signal and the input pressure signal.

12. The plasma processing system of claim 9, wherein the controller performs a proportional integral derivate (PID) control routine to generate the position signal.

13. The plasma processing system of claim 9, further comprising a user interface operatively connected to the controller, wherein the user interface displays an alarm message when an amperage rating of the consumable installed on the torch does not match an amperage level of a plasma processing operation.

14. The plasma processing system of claim 9, wherein the consumable installed on the torch includes a swirl ring.

15. The plasma processing system of claim 10, wherein the position signal provided to the gas pressure regulator has a duty cycle, and the controller is configured to determine whether the consumable installed on the torch corresponds to the at least one of the expected consumable parameters based on the duty cycle of the position signal.

16. The plasma processing system of claim 10, wherein the position signal provided to the gas pressure regulator has a magnitude, and the controller is configured to determine whether the consumable installed on the torch corresponds to the at least one of the expected consumable parameters based on the magnitude of the position signal.

17. A plasma processing system for performing a plasma operation, comprising:
a torch comprising a consumable installed on the torch;
a gas pressure regulator comprising a proportional valve, and a pressure sensor downstream of the proportional valve;
a gas conduit supplying gas from the gas pressure regulator to the torch;
a controller, comprising a processor, wherein the controller is operatively connected to the gas pressure regulator to receive a pressure signal from the pressure sensor, and to provide a position signal to the gas pressure regulator to control operations of the proportional valve and set an output pressure of the gas pressure regulator; and
a memory accessible by the controller and storing expected consumable parameters, wherein the controller is configured to identify the consumable based on a comparison of a position of the proportional valve to the expected consumable parameters, and generate an alarm output when an amperage rating of the consumable does not match an amperage level of the plasma operation.

18. The plasma processing system of claim 17, wherein the controller determines the position of the proportional valve from the position signal.

19. The plasma processing system of claim 18, further comprising an input pressure sensor configured to sense an input pressure to the gas pressure regulator, wherein the controller is operatively connected to the input pressure sensor to receive an input pressure signal from the input pressure sensor, and wherein the controller is configured to identify the consumable based on the position signal and the input pressure signal.

20. The plasma processing system of claim 19, wherein the memory stores a correlation between input pressures to the gas pressure regulator and respective position signal levels of said position signal.

21. The plasma processing system of claim 17, further comprising a user interface operatively connected to the controller, wherein the user interface displays an alarm message based on the alarm output, and wherein the controller performs a proportional integral derivate (PID) control routine to generate the position signal.

* * * * *